Dec. 23, 1969      W. H. WAIT      3,484,980
LURE STORAGE
Filed Aug. 17, 1967

INVENTOR.
WILLIAM H. WAIT
BY
Drummond & Cahill
ATTORNEYS

United States Patent Office 3,484,980
Patented Dec. 23, 1969

3,484,980
LURE STORAGE
William H. Wait, 1001 N. Main,
Las Vegas, Nev. 89101
Filed Aug. 17, 1967, Ser. No. 661,387
Int. Cl. A01k 97/06
U.S. Cl. 43—25.2                                          1 Claim

ABSTRACT OF THE DISCLOSURE

A container conveniently mounted on a fishing pole including therein a closed end having a permanent magnet secured thereto. The opposite end of the container from the closed end is open to receive a lure to thereby permit the hook secured to the lure to be attracted to and held by the permanent magnet, thus maintaining the lure within the container.

---

The present invention pertains to lure storage devices, and more specifically, to storage devices for utilization on a fishing pole for temporarily storing a lure when not in use.

When carrying a fishing pole such as when the fisherman is changing location or moving to a new area to continue fishing, it is inconvenient for him to remove the lure secured to his line. The only alternative left to the fisherman is to reel his line in until the lure is positioned at the end of the pole; however, the hooks of the lure as well as weights (if any) tend to become entangled in the line and obstruct the quick placement of a lure when an opportunity presents itself. Experienced anglers frequently devise means for securing the lure to a location other than the tip of the pole to free the lure and the hooks attached thereto from possible entanglement with the lines; however, these attempts have generally resulted in exposed hooks which snag on anything coming in contact therewith and are, once again, not as quick to cast as experienced anglers would like.

It is therefore an object of the present invention to provide a lure storage device for storing a lure to prevent entanglement of the hooks on the lure with the fishing line.

It is another object of the present invention to provide a lure storage device for temporarily storing a lure in a container while nevertheless permitting the lure to be withdrawn quickly and efficiently.

It is still another object of the present invention to provide a lure storage device for temporarily storing a lure and which may be removed or attached to a pole to permit the pole to be stored or to permit the storage device to be utilized on a different pole.

These and other advantages of the present invention will become apparent to those skilled in the art as the description thereof proceeds.

Briefly, in accordance with the embodiment chosen for illustration, a lure storage device is provided comprising a cylindrical storage container. The container includes one open end and a closed end having permanent magnets embedded therein. The lure with its hooks and other magnetically-attractable implements therein may be lowered into the container to cause the hooks to come in contact with the permanent magnets. The magnetic attraction keeps the lure within the container and out of contact with the fishing pole, fishing line, and other paraphernalia in the vicinity of the pole. The lure may conveniently be withdrawn from the container by simply pulling on the line and overcoming the force of magnetic attraction. This magnetic force is sufficient to support the weight of the lure and the line attached thereto so that the lure will remain in the container during substantially all normal handling of the pole.

The container itself incorporates a clip for ready positioning on a fishing pole. The clip permits removal of the container and placement of the container on a different pole if the angler chooses to change poles while fishing.

The present invention may more readily be described by reference to the accompanying drawings, in which.

Figure 1:
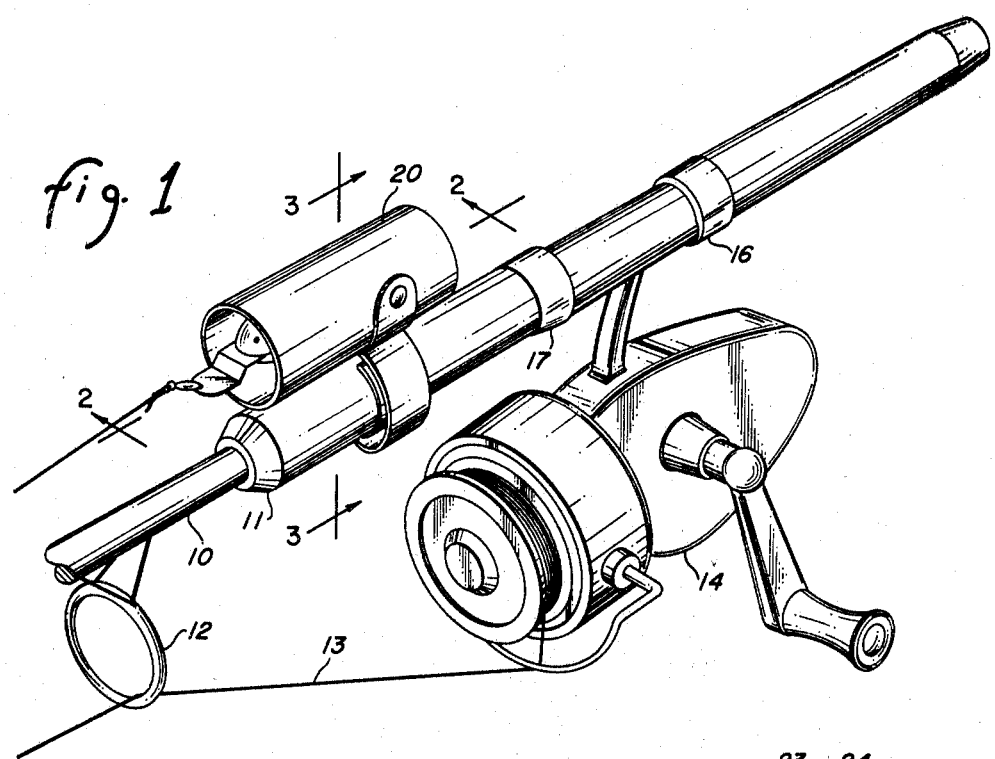
FIGURE 1 is a perspective view showing a portion of a fishing pole, a spinning reel, and a lure storage device constructed in accordance with the teachings of the present invention mounted on the pole.

Referring now to the drawings, a fishing pole 10 is shown having the customary elongated handle 11 thereon. The pole includes an eyelet 12 for receiving a fishing line 13 fed from a conventional spinning reel 14. The spinning reel is attached to the handle 11 through the expediency of sliding rings 16 and 17 in a manner well known in the art. The lure storage device of the present invention is shown comprising a cylindrical container 20 having an open end 21 and a closed end 22. It will be obvious to those skilled in the art that while the cylindrical container 20 utilizes a single side wall, other cross-sectional shapes of container may be used such as, for example, rectangular. In the embodiment chosen for illustration, the closed end 22 is formed through the utilization of a plastic material 23 having a plurality of bar magnets 24 embedded therein. It may be noted that the bar magnets 24 are shaped along the inner edges 25 thereof to provide a concave interior surface, the reason for which will become apparent as the description proceeds.

The container 20, in the embodiment chosen for illustration, includes a clip 30 secured thereto such as by rivets 31 and 32. The spring clip 30 permits the container 20 to be mounted on a variety of poles without regard to the precise diameter thereof.

Figure 2A:
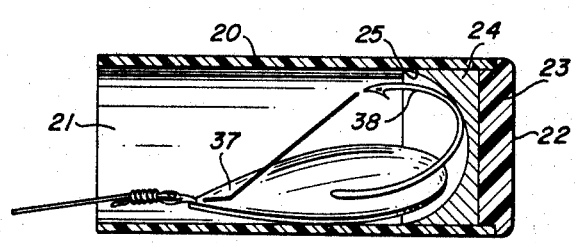
FIGURE 2a is a cross-sectional view of FIGURE 1 taken along line 2—2 showing the utilization of the lure storage device of the present invention for storing an alternative type of lure.
Figure 2:
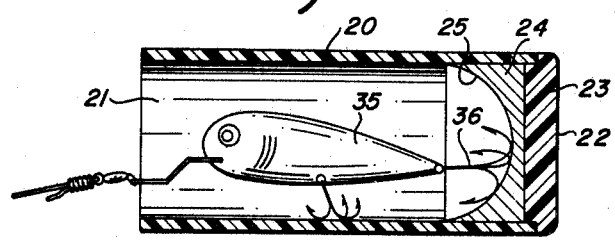
FIGURE 2 is a cross-sectional view of FIGURE 1 taken along line 2—2.
Figure 3:
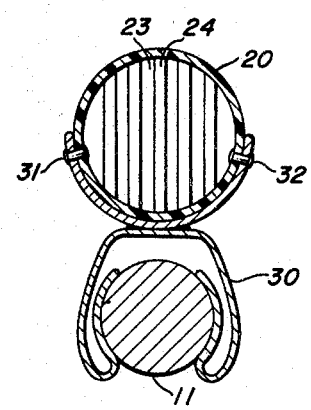
FIGURE 3 is a cross-sectional view of FIGURE 1 taken along line 3—3.

The container, after having been mounted on the fishing pole as shown for example in FIGURE 1, may be utilized to store a lure connected to the end of the end of the fishing line 13 simply by lowering the lure into the container until any magnetically attractable implement secured to the lure comes in contact with one or more of the permanent magnets 24. For example, the plug 35 shown in FIGURE 2 may be lowered until the hooks 36 secured thereto come in contact with the magnets; alternatively, the spoon-type lure 37 as shown in FIGURE 2a may be lowered into the container 20 until either the hook 38 or even the metal spoon 37 comes in contact with the magnets 24. The concavity provided by the shaping of the magnets 24 increases the force necessary to remove the lure from the container since the concavity conforms more closely to the contour of the hook normally coming in contact therewith. In other words, the surface coming in contact with the magnetic bars 24 is increased by forming the bars to provide a concave surface.

It will be obvious to those skilled in the art that the materials utilized to construct the container 20 or the materials utilized to construct the closed end 22 of the container are of no significance to the present invention; however, it will also be obvious that a suitable material would be plastic or a non-magnetic metal such as aluminum. Similarly, it will be obvious to those skilled in the art that the specific form of clip utilized with the present device has been chosen as an expedient and that a variety of clip forms may be utilized.

I claim:
1. A lure storage device comprising: a cylindrical container having a closed end and an open end for receiving a fishing lure; means secured to said container for attaching said container to a fishing pole; a plurality of bar magnets contoured to form a concave surface secured to the interior of said container adjacent the closed end thereof for attracting and holding hooks and other magnetically attractable implements attached to said lure to thereby hold said lure in said container.

References Cited

UNITED STATES PATENTS

| | | | |
|---|---|---|---|
| 2,584,430 | 2/1952 | Dayton et al. | 43—25.2 |
| 3,416,256 | 12/1968 | Blocker | 43—25.2 X |
| 402,270 | 4/1889 | Mumford | 43—25.2 |
| 3,142,931 | 8/1964 | Ulsh | 43—57.5 |
| 3,197,915 | 8/1965 | Staver | 43—57.5 |

FOREIGN PATENTS 732,817  4/1966  Canada.

SAMUEL KOREN, Primary Examiner

D. J. LEACH, Assistant Examiner

U.S. Cl. X.R.

43—57.5